Jan. 7, 1958                E. F. CASWELL                2,818,617
                              WORK CHUCK
Filed Oct. 10, 1955                                    4 Sheets-Sheet 1

INVENTOR.
EDGAR F. CASWELL
BY
*Whittemore, Hulbert & Belknap*
ATTORNEYS

Jan. 7, 1958     E. F. CASWELL     2,818,617
WORK CHUCK

Filed Oct. 10, 1955     4 Sheets-Sheet 4

INVENTOR.
EDGAR F. CASWELL
BY
ATTORNEYS

United States Patent Office 2,818,617
Patented Jan. 7, 1958

2,818,617
WORK CHUCK

Edgar F. Caswell, Detroit, Mich., assignor to Kelsey-Hayes Company, a corporation of Delaware Application October 10, 1955, Serial No. 539,403

11 Claims. (Cl. 22—58.5)

This invention relates to work chucks and refers more particularly to an improved construction of chuck for clamping work parts together.

The invention has for one of its objects to provide an improved construction of work chuck which provides for automatically clamping and advancing the work.

The invention has for another object to provide a work chuck having a work engaging jaw movable to operative and inoperative positions respectively engageable with and clearing a work part upon relative movement of a work advancing member and the member against which the work part is clamped by the jaw.

The invention has for a further object to provide a work chuck operable to clamp work parts of varying shapes and dimensions.

With these and other objects in view, the invention resides in the novel features of construction and combination and arrangements of parts as more fully hereinafter set forth.

Figure 1:
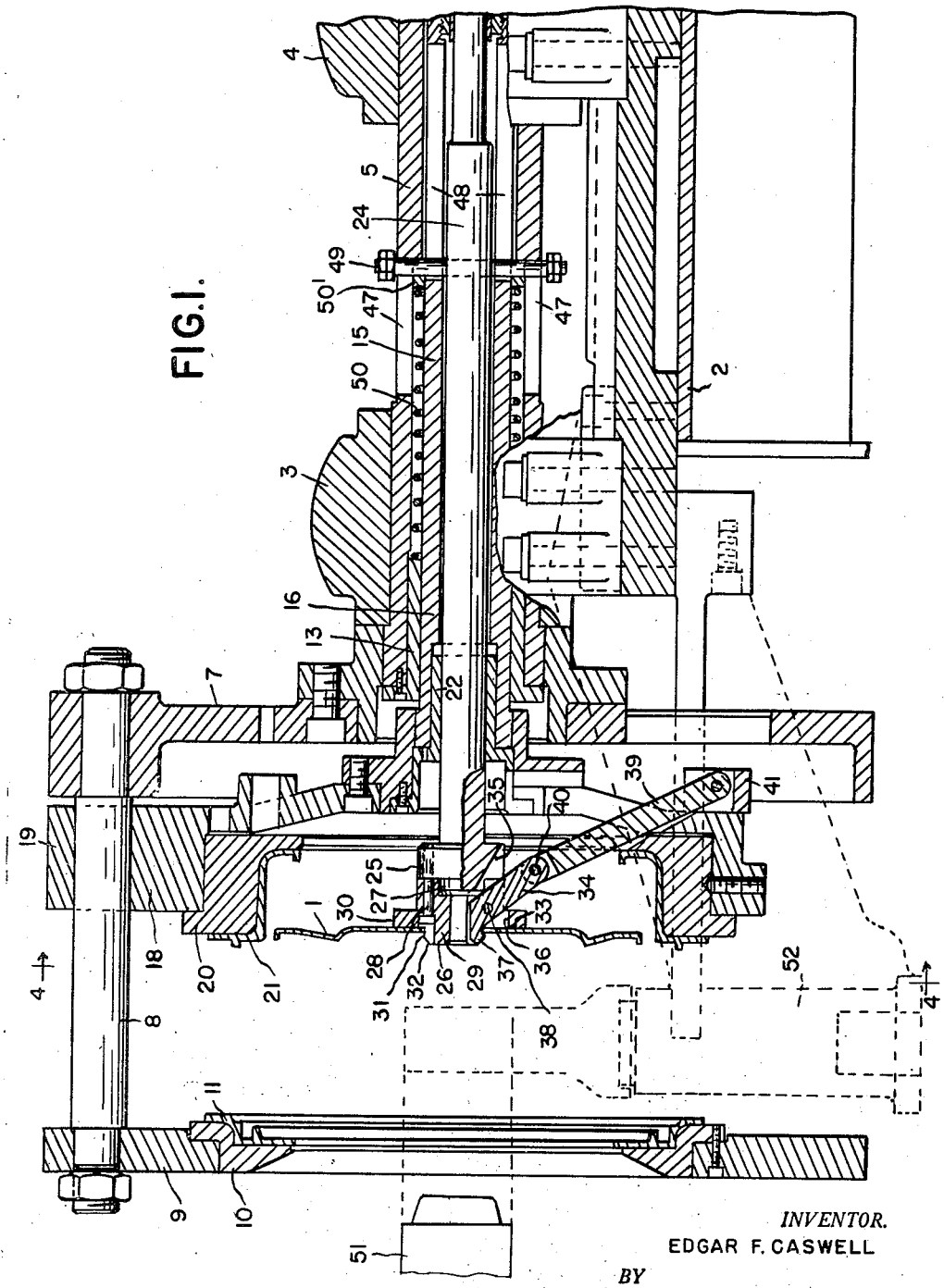
Figure 1 is a longitudinal sectional view of the front end portion of a work chuck embodying the invention with the parts shown in retracted position.

In the present instance, the work chuck is designed to clamp together annular work parts, in particular shell mold sections to clamp a radial part, in particular a brake drum back against one shell mold section, although it is apparent that the chuck may be used for clamping other work parts.

The chuck comprises a frame 2 having aligned pillow blocks 3 and 4 mounted thereon in axially spaced relation. A tubular shaft or spindle 5 is journaled for rotation in the pillow blocks and has a driven pulley 6 keyed thereto which may be rotated by a drive pulley and belt not shown. An annular disc-shaped driving member 7 is secured to the front end of the tubular shaft 5, and three angularly spaced rods 8 are secured to and project forwardly from the driving member 7 in parallel relation to the axis of the shaft 5. An annular die ring frame 9 is secured to the front ends of the rods 8 and a front die ring or abutment 10 is secured to the die ring frame. The annular work part or flange and face section 11 of the resin sand shell mold 12 is laid in the die ring or abutment 10. The rods 8 are equally spaced from the axis of the tubular shaft 5 and the flange and face section 11 of the shell is concentrically arranged with the axis of the tubular shaft 5, so that the flange and face section 11 will rotate about its own axis when the tubular shaft rotates.

The tubular shaft 5 is provided with front and rear tubular bushings 13 and 14 which support the elongated draw bar 15 within the tubular shaft for axial sliding movement. The draw bar consists of a front tubular main section 16 and a rear section 17 threadedly connected together.

A rear die ring frame 18 is provided having angularly arranged ears 19 formed with openings which slidably receive the respective rods 8 to permit the rear die ring frame 18 to slide on the rods toward and away from the front die ring frame 9. A die ring or abutment 20 is secured to the die ring frame 18, and the other annular work part or body section 21 of the resin sand shell 12 is laid in the die ring 20 in concentric relation to the tubular shaft 5 so that it rotates about its own axis when the tubular shaft is rotated.

The draw bar 15 is provided with front and rear tubular bushings 22 and 23 for supporting the locating bar 24 for axial sliding movement within the draw bar. The locating bar 24 has an annular enlargement 25 adjacent its front end, and the rear end of the pilot head 26 has a cup-shaped recess 27 for receiving the front end of the locating bar. Fastening elements 28 pass through the enlargement 25 and connect the pilot head to the locating bar. The pilot head has a nose 29 at the front and an annular enlargement 30 spaced rearwardly from the front end. The nose 29 has a cylindrical surface 31 extending into the central aperture of the radial work part or drum back 1 to support and locate the same. The cylindrical surface 31 connects into a conical surface 32 which extends to the front end of the nose. The front surface 33 of the annular enlargement 30 extends at right angles to the axis of the locating bar and provides a rear abutment for the drum back 1.

The drum back 1 is clamped against the abutment surface 33 by clamping jaws or fingers 34. The jaws 34 are mounted on the pilot head to swing radially of the head. These jaws extend within slots 35 in the locating bar and through the openings 36 in the pilot head and have lateral extensions 37 at their ends beyond the abutment face 33 for extending through the aperture of the drum back and engaging the front side thereof. The jaws are pivotally mounted upon the pilot head 26 by means of the pins 38 which extend chordwise of the pilot head at the rear side of the drum back. The chuck also has the links 39 which are pivotally connected to the ends of the jaws 34 remote from the lateral extensions 37 by the pins 40 which extend parallel to the respective pins 38. The links 39 extend generally radially of the chuck and are also pivotally connected to blocks 41 secured to the die ring frame 18. These links function upon relative axial movement of the draw bar and locating bar to swing the jaws so that their lateral extensions 37 clear the edge of the central opening of the drum back 1 or engage or abut the front side thereof and clamp the drum back against the abutment surface 33.

Figure 2:
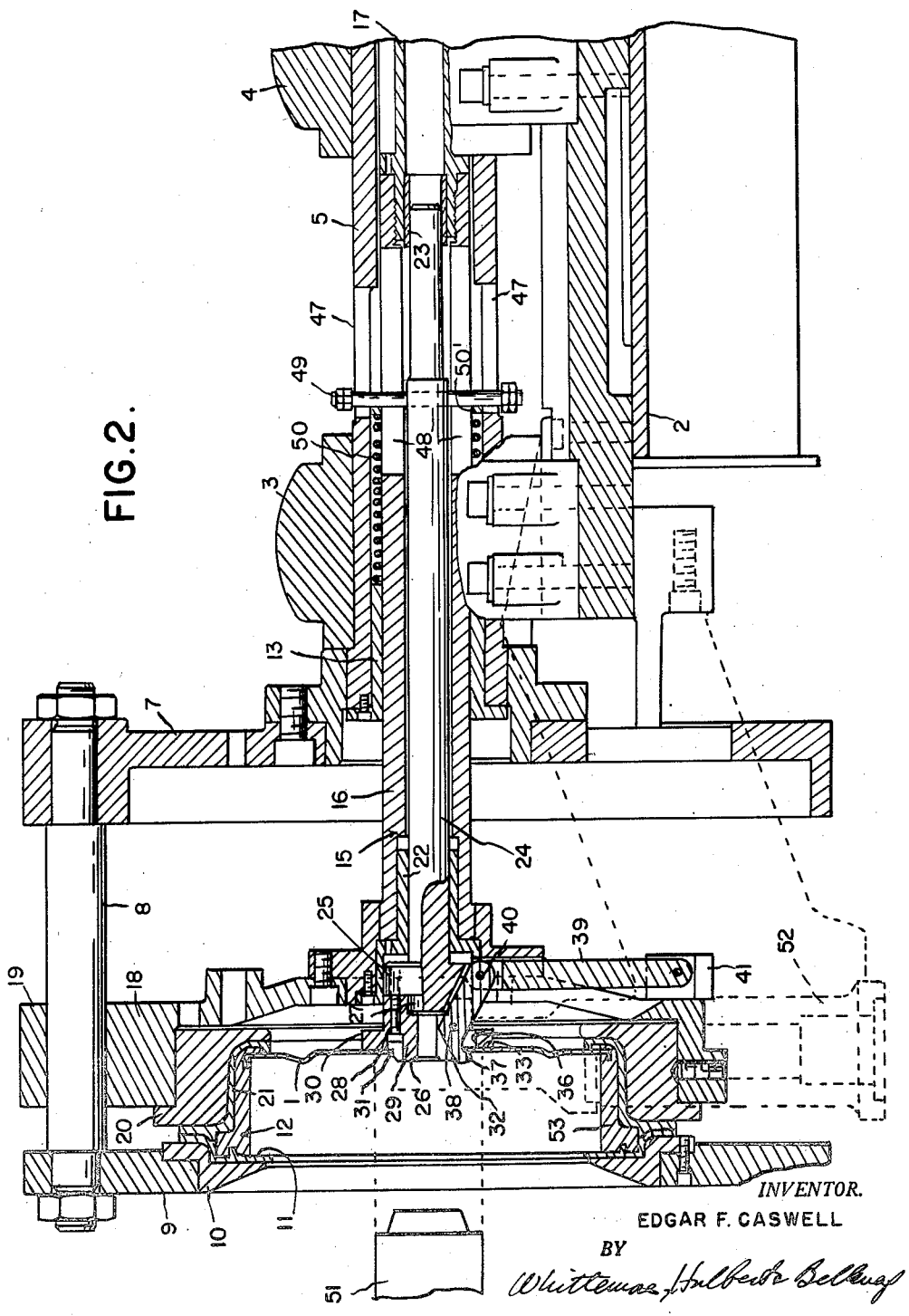
Figure 2 is similar to Figure 1 showing the parts in advanced position.
Figure 3:
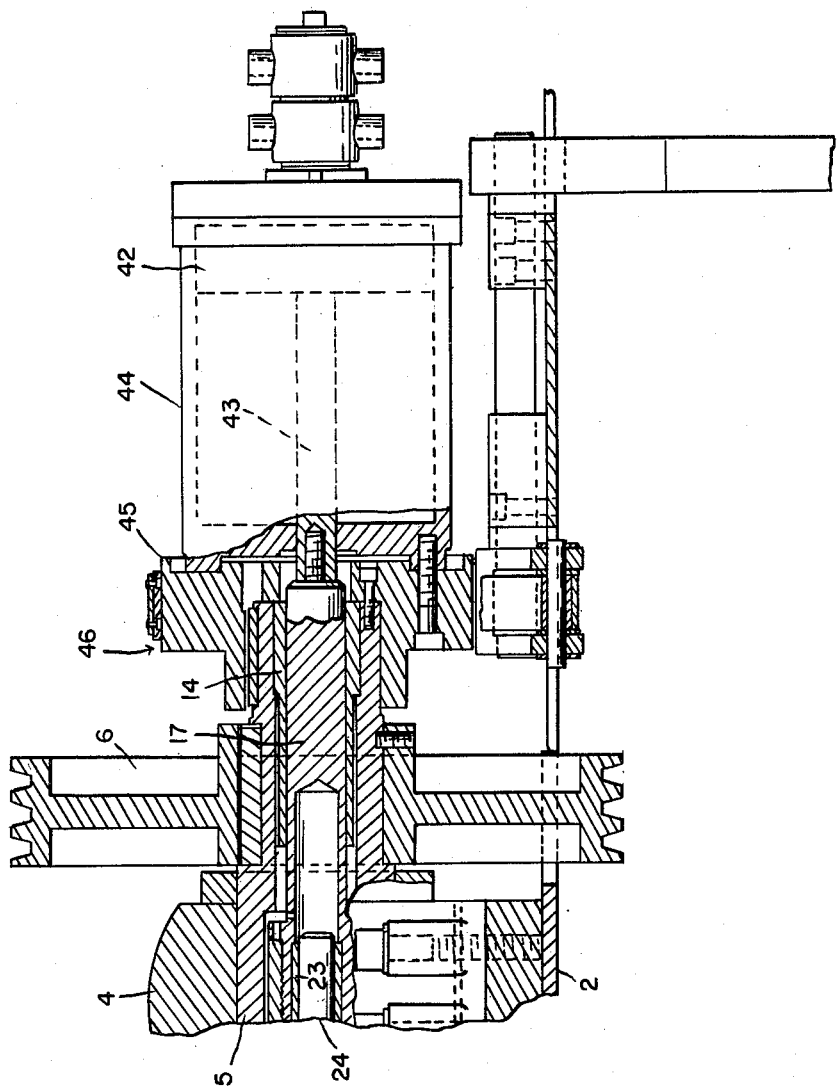
Figure 3 is a view partly in section and partly in elevation of the rear end of the apparatus with parts retracted.

For reciprocating the draw bar 15 there is the piston 42 having a rod 43 secured to the rear end of the rear section 17 of the draw bar. The piston reciprocates in a cylinder 44 secured to the brake drum 45 of the brake 46, and the brake drum 45 is secured to the tubular shaft 5. The cylinder 44 is provided with suitable ports at its ends for the inlet and outlet of compressed air to reciprocate the piston and hence the draw bar between the retracted and advanced positions shown respectively in Figures 1 and 2.

The tubular shaft has the diametrically opposite elongated slots 47, and the tubular section 16 of the draw bar 15 also has diametrically opposite elongated slots 48. A pin 49 extends transversely through and secures the locating bar 24, and has its opposite ends extending through the slots 47 and 48 so that the tubular shaft 5, draw bar 15 and locating bar 24 rotate as a unit.

A compression coil spring 50 encircles the draw bar 15 and has one end abutting the rear end of bushing 13 and the other end abutting the pressure ring 50' which encircles the draw bar at the front side of the pin 49. The locating bar 24 is normally urged to the retracted position of Figure 1, determined by the engagement of pin 49 with the rear ends of slots 47 in the tubular shaft 5.

A ladle 51, shown in dotted lines, is supported for swinging movement about the vertical axis of pivot 52 to pour molten brake friction material 53 into the rotating shell mold 12 in the advanced position of the chuck.

Figures 4, 5:
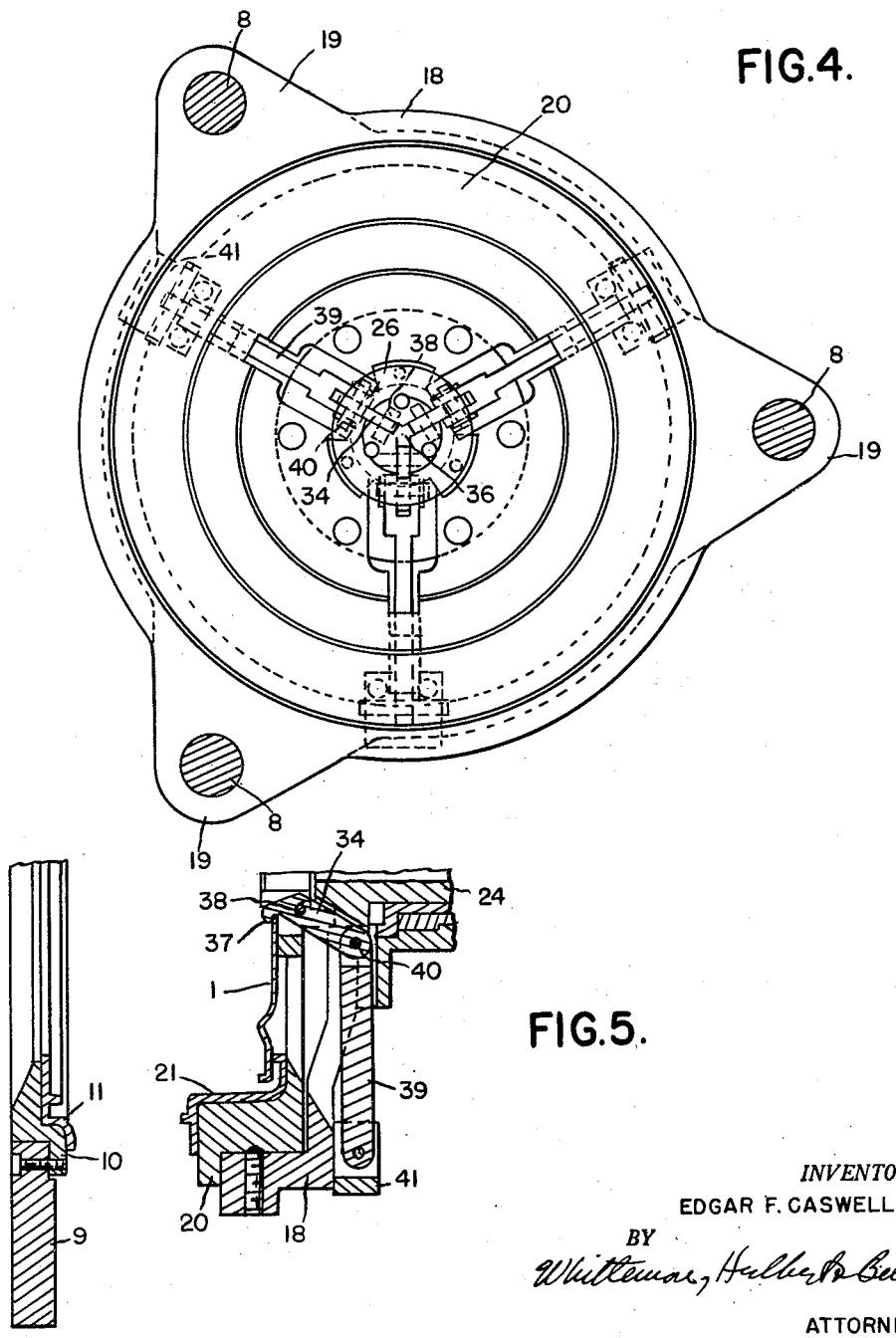
Figure 4 is a cross-section on the line 4—4 of Figure 1.
Figure 5 is a fragmentary view showing the parts in an intermediate position.

In operation, a drum back 1 is placed on the cylindrical surface 31 in the retracted position of the chuck. In retracted position, shown in Figure 1, the lateral extensions 37 of the links 34 are located radially inwardly of the central aperture of the drum back to clear the same. Upon initial advance of the draw bar, the links and jaws assume the relative position shown in Figure 5 in which the links extend substantially at right angles to the axis of rotation of the tubular shaft 5 and position the jaws 34 so that their lateral extensions 37 extend over and engage the front side of the drum back and clamp the same against the abutment surface 33. At substantially the same time that the links assume this position, which is after about forty percent (40%) of its total forward advance, the body section 21 of the shell 12 engages the rear side of the drum back and continued advance of the draw bar causes the chuck to assume the position shown in Figure 2. Actually, the jaws 34 clamp the drum back slightly before the links reach the right angle position shown in Figure 5 so that the drum back is fully clamped before the body section 21 engages the drum back. The locating bar is advanced by means of the lateral extensions 37 of the jaws 34 engaging the drum back, and the jaws being mounted on the pilot head 26 of the locating bar 24. The advance of the draw bar is limited by engagement of the shell mold section 21 with the section 11 to close the mold.

The friction material 53 will be poured into and centrifugally cast in the rotating shell after which the draw bar 15 is retracted. The compression spring 50 retracts the locating bar 24 as a unit with the draw bar until pin 49 strikes the rear end of slots 47. During such retraction, the shell section 11 pulls out of the die ring 10. The draw bar continues to retract after further retraction of the locating bar 24 is prevented by engagement of pin 49 with the rear end of slots 47, whereupon links 39 operate to move jaws 34 to their release positions due to the relative movement between the draw bar and locating bar. During such continued retraction of the draw bar, the die ring 20 pulls away from shell section 21. The centrifugally cast drum including the back 1 and friction material 53 may be removed from the chuck, and the shell sections 11 and 21 are removed from the completed drum.

It will be apparent that as a result of the free floating support for the locating bar in which it is resiliently held retracted by the spring 50, that variations in shape and dimensions of the drum back can be readily accommodated by the chuck. Thus, for example, if a drum back of a somewhat different shape or thickness is to be clamped, the locating bar 24 will not be advanced until the drum back is engaged by the mold section 21. Thereafter, the draw bar 15 and locating bar 24 advance as a unit compressing spring 50 to the extent necessary. The extent of compression of spring 50 will, of course, vary depending upon the dimensions of the drum back. In this regard, it should be pointed out that the resin sand shell mold sections are relatively fragile, and excessive pressure between the contacting surfaces of the drum back and mold sections present the danger of possible damage to the mold sections. The length and strength of spring 50 is such that these excessive pressures will not occur throughout the full extent of spring compression during forward movement of the parts, and despite moderate variations in dimensions of the drum back, the pressure of engagement between the mold section and drum back will not change substantially due to these characteristics of the spring. It will also be appreciated that variations in dimensions of the shell mold sections may be accommodated in like manner. Such variations in drum back or mold section dimensions, if not extremely excessive, will be readily accommodated without affecting the clamping action of the jaws 34 which are, of course, controlled by the die ring frame 18 through links 39.

What I claim as my invention is:

1. A work chuck comprising a reciprocable member having an abutment engageable with one side of a work part for advancing the same upon advance of said reciprocable member, a second member having an abutment engageable with a corresponding side of a second work part, and clamping means operated by advance of said reciprocable member and engageable with the other side of the second work part to clamp the latter against said second-mentioned abutment, the first-mentioned work part being advanced by said reciprocable member into engagement with the second work part after clamping of the latter by said clamping means.

2. A chuck for securing separate work parts together comprising a reciprocable member having an abutment engageable with one side of a work part for advancing the same upon advance of said member, a second reciprocable member having an abutment engageable with a corresponding side of a second work part, clamping means on said second reciprocable member operated by advance of said first-mentioned reciprocable member and engageable with the other side of the second work part to clamp the latter against said second-mentioned abutment during initial advance of said first-mentioned reciprocable member, said first-mentioned reciprocable member during further advance moving the first-mentioned work part into engagement with the second part to advance the latter and hence said second reciprocable member as a unit with said first mentioned reciprocable member a predetermined distance, and means urging the parts together during advance of the parts while in engagement, said last-mentioned means being yieldable to accommodate work parts of somewhat varying shapes and dimensions without substantially changing the pressure of engagement therebetween.

3. A chuck for securing separate work parts together comprising a reciprocable member having an abutment engageable with one side of a work part for advancing the same upon advance of said member, a second reciprocable member having an abutment engageable with a corresponding side of a second work part, clamping means on said second reciprocable member operated by advance of said first-mentioned reciprocable member and engageable with the other side of the second work part to clamp the latter against said second-mentioned abutment during initial advance of said first-mentioned reciprocable member, said first-mentioned reciprocable member during further advance moving the first-mentioned work part into engagement with the second part to advance the latter and hence said second reciprocable member as a unit with said first-mentioned reciprocable member, and means for yieldably resisting advance of said second reciprocable member.

4. A chuck for securing separate radial and annular work parts together comprising a reciprocable member having an abutment engageable with one side of an annular part for advancing the same, a second reciprocable member having an abutment engageable with a corresponding side of a radial part, clamping jaws carried by said second reciprocable member and engageable with the other side of the radial part to clamp the radial part against said second-mentioned abutment, links pivotally connected to said jaws and operated by said first-mentioned reciprocable member to swing said jaws into clamping engagement, the annular part being advanced by said first-mentioned reciprocable member into engagement with the radial part after clamping of the radial part by said jaws to advance the radial part and hence said second-mentioned reciprocable member, and means for yieldably resisting advance of said second reciprocable member upon engagement of the annular part with the radial part during the advance of said first-mentioned reciprocable member.

5. A chuck for securing together a centrally apertured radial part and an annular part comprising a reciprocable member having an abutment engageable with one side of the annular part for advancing the same upon advance of said member, a second reciprocable member having an abutment engageable with a corresponding side of the apertured radial part and having angularly spaced slots, clamping jaws pivoted to said second reciprocable member and extending within said slots, said jaws having lateral extensions movable through the aperture in the radial part and engageable with the opposite side thereof, links pivotally connected to said jaws and to said first-mentioned reciprocable member for operation by the latter upon initial advance thereof to swing said jaws to operative position with said lateral extensions engaging the opposite side of the radial part, said first-mentioned reciprocable member upon further advance moving the annular part into engagement with the radial part to advance the radial part and hence said second reciprocable member as a unit with said first-mentioned reciprocable member, means for advancing and retracting said first-mentioned reciprocable member, spring means for retracting said second reciprocable member as a unit with said first-mentioined reciprocable member during the first portion of the retraction of the latter, stop means engageable with said second reciprocable member to limit further retraction thereof, the continued retraction of said first-mentioned reciprocable member after engagement of said second reciprocable member with said stop means operating upon said links to swing said jaws to inoperative position with said lateral extensions clearing the radial part.

6. A chuck for securing first and second work parts together and a third work part against the first part comprising a support for the first part, a reciprocable member having an abutment engageable with one side of the second part to advance the same upon advance of said reciprocable member, a second reciprocable member having an abutment engageable with the corresponding side of the third part, clamping means on said second reciprocable member operated by advance of said first-mentioned reciprocable member and engageable with the other side of the third part to clamp the latter against said second-mentioned abutment during initial advance of said first-mentioned recpirocable member, said first-mentioned reciprocable member during further advance moving the second part against the third part, advancing said second reciprocable member as a unit with the first-mentioned reciprocable member through the engagement of the second and third parts, and finally moving the second part against the first part.

7. A chuck for securing first and second work parts together and a third work part against the first part comprising a support for this first part, a reciprocable member having an abutment engageable with one side of the second part to advance the same upon advance of said reciprocable member, a second reciprocable member having an abutment engageable with the corresponding side of the third part, clamping means on said second reciprocable member operated by advance of said first-mentioned reciprocable member and engageable with the other side of the third part to clamp the latter against said second-mentioned abutment during initial advance of said first-mentioned reciprocable member, said first-mentioned reciprocable member during further advance moving the second part against the third part, advancing said second reciprocable member as a unit with the first-mentioned reciprocable member through the engagement of the second and third parts, and finally moving the second part against the first part, and means urging said second and third parts together during the full advance thereof while in engagement, said last-mentioned means being yieldable over a predetermined range to accommodate second and third parts of slightly varying shapes and dimensions without substantially changing the pressure of engagement therebetween.

8. A chuck for securing first and second work parts together and a third work part against the first part comprising a support for the first part, a reciprocable member having an abutment engageable with one side of the second part to advance the same upon advance of said reciprocable member, a second reciprocable member having an abutment engageable with the corresponding side of the third part, clamping means on said second reciprocable member operated by advance of said first-mentioned reciprocable member and engageable with this other side of the third part to clamp the latter against said second-mentioned abutment during initial advance of said first-mentioned reciprocable member, said first-mentioned reciprocable member during further advance moving the second part against the third part, advancing said second reciprocable member as a unit with the first-mentioned reciprocable member through the engagement of the second and third parts, and finally moving the second part against the first part, and spring means for resisting advance of said second reciprocable member.

9. A chuck for securing separate annular work parts together and a separate radial work part against one of the annular work parts comprising a support for one annular part, a reciprocable member, an abutment upon said reciprocable member engageable with one side of the other annular part to advance the same upon advance of said reciprocable member, a second reciprocable member, an abutment on said second reciprocable member engageable with the corresponding side of the radial part, clamping jaws pivotally carried by said abutment and engageable with the other side of the radial part to clamp the radial part against said second-mentioned abutment, links pivotally connected to said jaws and operated by advance of said first-mentioned reciprocable member to swing said jaws into clamping engagement during the initial advance of said first-mentioned reciprocable member, said first-mentioned reciprocable member during further advance moving the said other annular part against the radial part, advancing said second reciprocable member by means of the radial part in engagement with the said other annular part and finally moving the said other annular part against the said one annular part, and spring means for resisting advance of said second reciprocable member.

10. A chuck for securing separate annular shell mold sections together and a separate radial centrally apertured drum back against one of the annular shell mold sections comprising a support for one mold section, a reciprocable member having an abutment engageable with one side of the other mold section to advance the same upon advance of said reciprocable member, a second reciprocable member having a portion extending into the aperture in the drum back to support the same and having an abutment engageable with the corresponding side of the drum back and having angularly spaced slots, clamping jaws pivoted to said second reciprocable member and extending within said slots, said jaws having lateral extensions movable through the aperture in the drum back and engageable with the opposite side thereof, links pivotally connected to said jaws and to said first-mentioned reciprocable member for operation by the latter upon initial advance thereof to swing said jaws to operative position with said lateral extensions engaging the opposite side of the drum back, said first-mentioned reciprocable member upon further advance moving the said other mold section into engagement with the drum back to advance the drum back and hence said second reciprocable member as a unit with said first-mentioned reciprocable member and finally moving the said other annular part against the said one annular part, means for advancing and retracting said first-mentioned reciprocable member, spring means for retracting said second reciprocable member as a unit with said first-mentioned reciprocable member during the first portion of the retraction of the latter, stop means engageable with said second reciprocable member to limit further retraction thereof, the continued retraction of said first-mentioned reciprocable member after engagement of said second reciprocable member with said stop means operating upon said links to swing said jaws to inoperative position with said lateral extensions clearing the drum back.

11. A work chuck comprising a reciprocable member engageable with a work part to advance the same upon advance of said reciprocable member, means operated by advance of said reciprocable member for clamping a second work part in position to be engaged by the first-mentioned work part during its advance, and yieldable means for resisting advance of said clamping means by engagement of said first-mentioned work part with said second-mentioned work part.

References Cited in the file of this patent
UNITED STATES PATENTS

| | | |
|---|---|---|
| 1,983,839 | Dake | Dec. 11, 1934 |
| 2,085,394 | Sargent | June 29, 1937 |
| 2,261,612 | Batie | Nov. 4, 1941 |
| 2,269,669 | Kelly | Jan. 13, 1942 |
| 2,738,038 | Horn et al. | Mar. 13, 1956 |